April 1, 1952  R. E. NELSON  2,591,187
ENGINE EXHAUST CONDENSER
Filed April 18, 1950  4 Sheets-Sheet 1
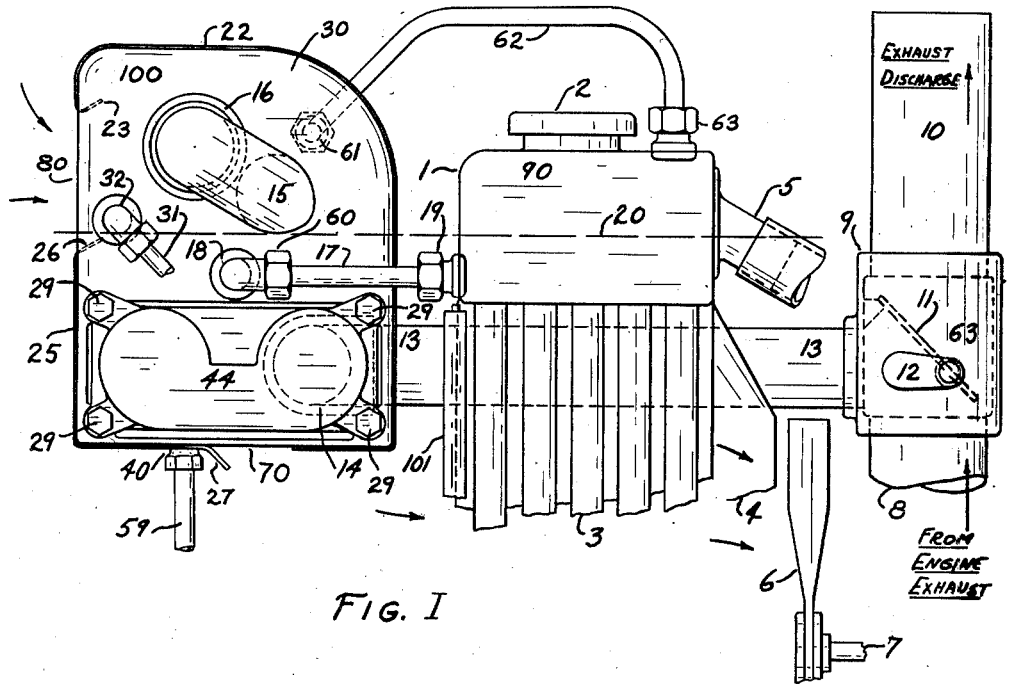
FIG. I
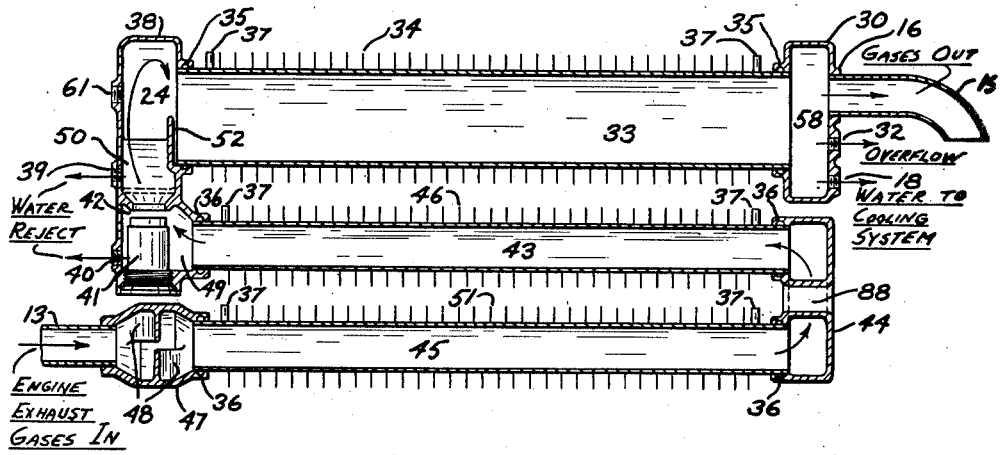
FIG. II
Robert E. Nelson
INVENTOR.

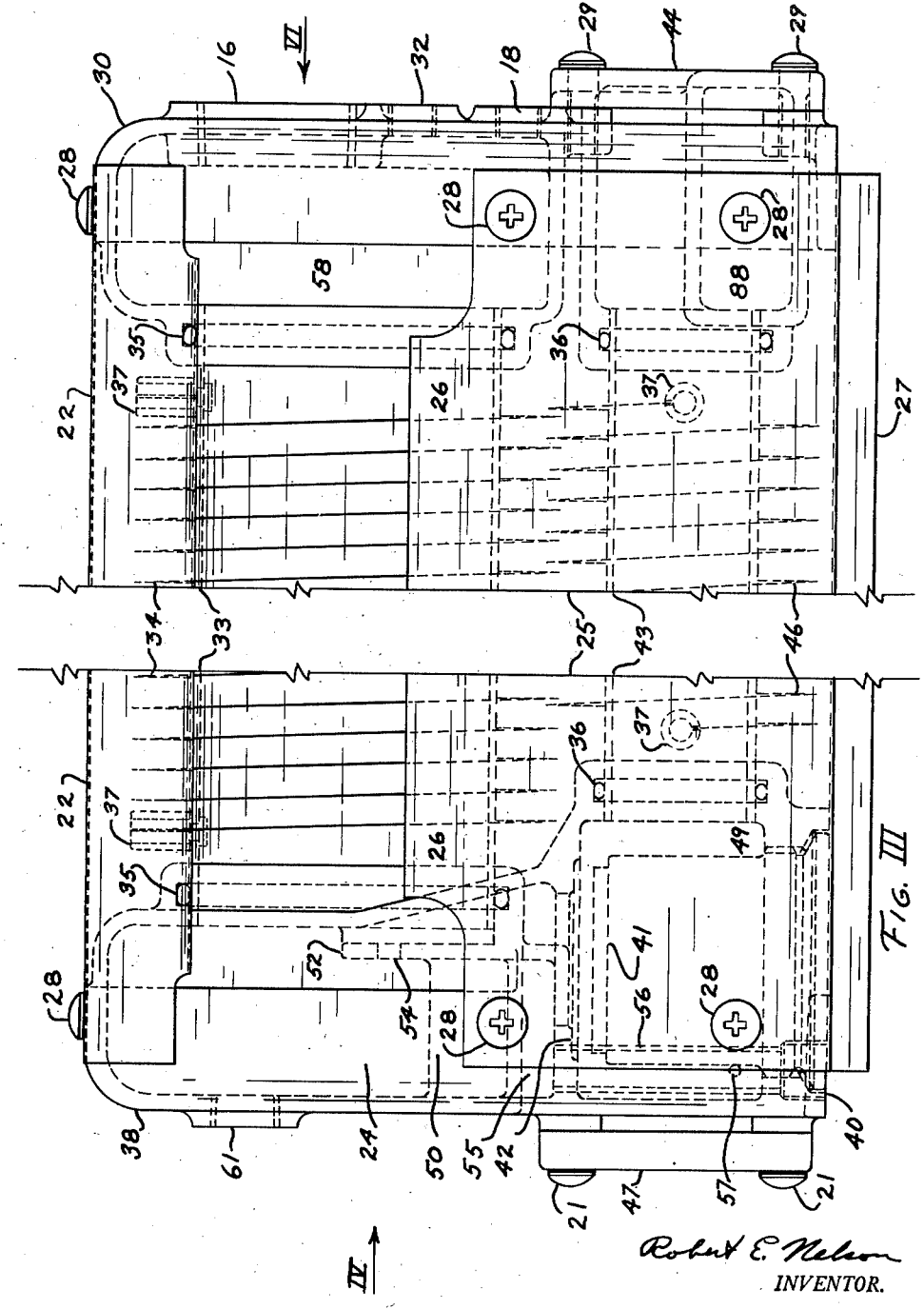
April 1, 1952
R. E. NELSON
2,591,187
ENGINE EXHAUST CONDENSER
Filed April 18, 1950
4 Sheets-Sheet 2
FIG. III
Robert E. Nelson
INVENTOR.

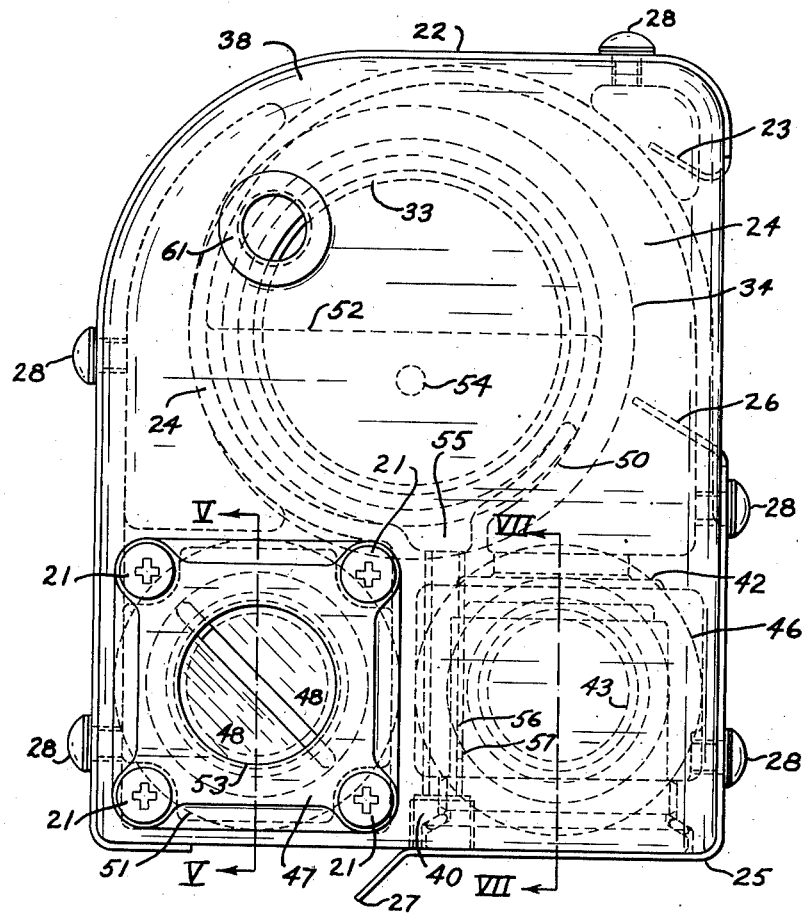
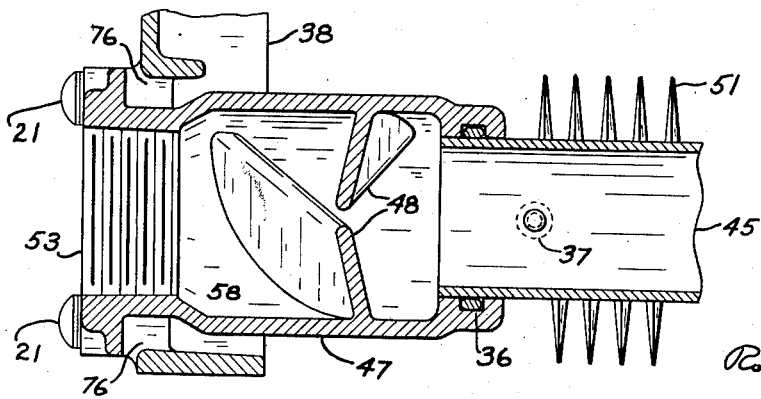

April 1, 1952
R. E. NELSON
2,591,187
ENGINE EXHAUST CONDENSER
Filed April 18, 1950
4 Sheets-Sheet 4
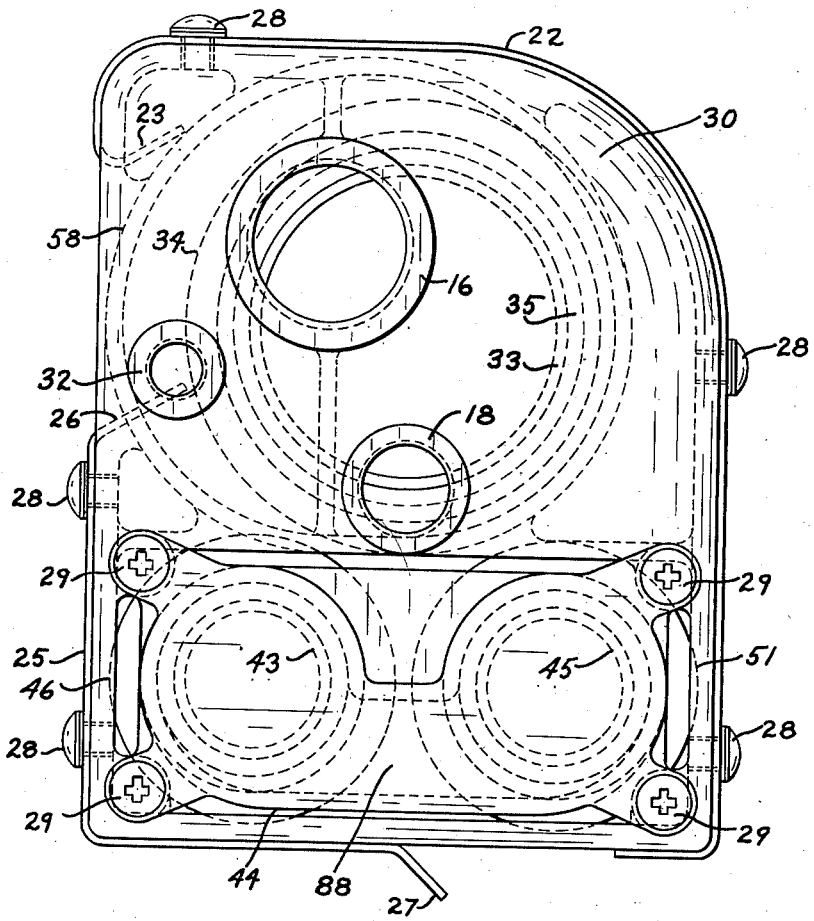
FIG. VI
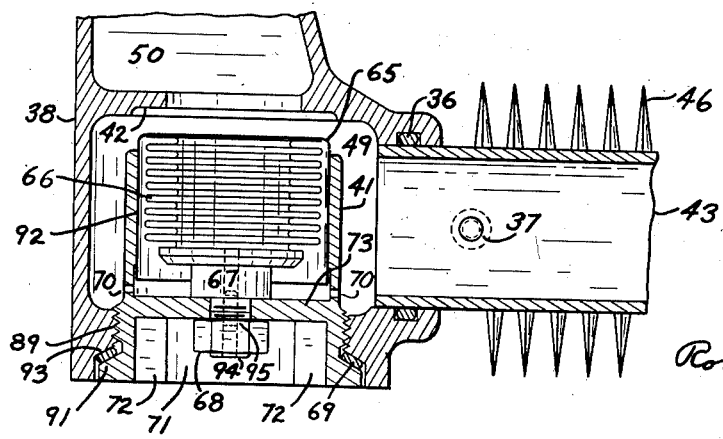
FIG. VII
Robert E. Nelson
INVENTOR.

Patented Apr. 1, 1952

2,591,187

UNITED STATES PATENT OFFICE 2,591,187

ENGINE EXHAUST CONDENSER

Robert E. Nelson, Kern County, Calif.

Application April 18, 1950, Serial No. 156,604

14 Claims. (Cl. 123—41.21)

This invention relates to the recovery of water from combustion product gases, particularly those of internal combustion engines. Although directed specifically to the problem of maintaining a supply of water in engine cooling systems, the condenser of this invention could also be used to furnish water for some other purpose such as for use in storage batteries.

Engine cooling systems are generally subject to loss of water both by leakage and by evaporation. It is a principal object of this invention to replenish the water so lost automatically by condensation from the exhaust of the engine, thereby making replenishment independent of any external source.

As water is lost by evaporation from an engine cooling system and made up, as is customary, by additions from an external source, there is a tendency for concentration of minerals dissolved therein to occur until precipitation occurs in the form of mineral scale. This is a serious problem in "hard" water regions and of consequence in most. My invention is intended to overcome this difficulty by providing replacement water for the engine cooling system which will be free of such scale-forming minerals.

Although recovery of water from engine exhaust gases is well known, none of the condenser systems so far used for other purposes of which I am aware are suited to the present purpose, not only for structural reasons but because the water which they produce contains carbon and other solids from the engine exhaust as well as acid constituents derived from the combustion of the sulphur present to some degree in most engine fuels. It is an object of my invention to obtain a condensate from which these impurities are eliminated or reduced to an acceptable amount.

To obtain a purified condensate I divide that portion of the condenser in which precipitation occurs into two sections through which the exhaust gases must pass in series. A thermostatic control is used to hold the temperature at the point of separation of water recovery low enough to insure precipitation in the first condenser section but high enough to maintain the recovery of the second. Water from the first condensing section, which is rejected, carries with it most of the solids and acid-forming constituents contained in the combustion product gases which pass through that section. The relatively pure water recovered by the second section is used in the cooling system of the engine.

When installed in combination with a conventional radiator-cooled engine, my condenser is preferably placed in the cooling air stream of the engine radiator, ahead of the radiator and high enough to deliver its product to the top tank of the cooling system by gravity.

Further objects of my invention which relate to methods and means employed to carry out the foregoing more general objects will appear from the description to follow, taken together with the drawings, in which:

Figure I shows my exhaust condenser as installed in cooperation with the cooling and exhaust systems of a conventional recirculating liquid cooled engine;

Figure II is a schematic of the condenser alone;

Figure III is a front elevation of a preferred embodiment of my invention;

Figures IV and VI are left and right end views of the condenser shown in Figure III;

Figures V and VII are sections through the intake and thermostat positions as indicated on Figure IV.

In Figure I the numeral 1 designates generally a conventional radiator, the upper portions of which are shown. The radiator 1 includes a top tank 90, a radiating tube section 3, a filler 2, and a recirculating water connection from the engine at 5. Air is drawn into the radiator by the fan 6 driven from the engine through the shaft 7. The numeral 4 designates a conventional fan shroud and the numeral 101 a conventional shutter for limiting the flow of air through the radiator under cold-weather conditions. This shutter, which may be manually or thermostatically operated, is useful not only to limit the flow of cooling air through the radiator itself, but also the flow induced in the condenser, in order to prevent over-condensing in the first condenser section. Control of the flow of cooling air through the condenser could, of course, be accomplished by means of a shutter placed on the condenser itself; but the construction shown is preferred because both condenser and radiator benefit together when curtailment of air flow is required.

The condenser 100 is placed in the cooling air stream ahead of the radiator and high enough to allow delivery of its product to the top tank 90 and to maintain the level indicated by the numeral 20 therein. The exact placing of this condenser is uncritical. Adequate air flow through the condenser is usually obtained without difficulty and without the need of any close shrouding between the condenser and the radiator top structure, even, as a rule, when a false radiator shell is used.

Water condensed for use in the radiator 1 passes from the condenser 100 into the line 17, which delivers to the radiator top tank 90 at 19. Reject water containing impurities derived from the exhaust gases leaves the condenser at 40, discharging through the drain tube 59. Water in excess of that required to maintain the level 20 may be overflowed at 32 through the tube 31; or, as will later appear, this water may be overflowed within the condenser to join the reject water. The combined overflow is preferred unless it is desired to recover the excess water externally.

The radiator top tank 90 may be vented to the atmosphere, either directly or through a conventional high-level internal overflow tube. Either method will be satisfactory except on those engines which may operate all or part of the time at abnormally high temperatures and which are subject to rapid loss of water vapor from the radiator top tank 90, as by boiling. When it is necessary to meet such a condition I add the vapor tube 62, which takes the vapor so generated from the top tank 90 at 63 and delivers it to the condenser 100 at 61. This connection allows the condenser to recover a substantial part of the water which would otherwise be lost.

Combustion product gases from the engine are delivered through the duct 8 to the take-off fitting 9, which divides the exhaust into two parts, one of which passes out through the discharge pipe 10 and the other of which is delivered by the tube 13 to the condenser 100 at 14. The rate of delivery of gases to the condenser depends on the pressure available at the delivery end of the supply tube 13. I have found a pressure on the order of 2 inches of water adequate under average conditions. The exhaust back-pressure of most engines under substantial load is more than this; but under part-load or idling conditions the exhaust pressure may fall below this minimum, with a corresponding reduction in the potential water yield of the condenser. Often this is of little consequence because the production of water at those times when the engine is well loaded is adequate to keep up with the demand. However, when it is expected that the engine will be required to operate all or a great part of the time lightly loaded, some means for insuring the desirable minimum exhaust pressure becomes desirable. For this purpose I place the damper 11 in the path of the outgoing gases in the fitting 9. The setting of this damper may be manual; but some means for loading the damper yieldably is to be preferred. Such means could be a spring or, as shown in the figure, a weighted arm acting upon the damper 11 through the shaft 63. This arm 12 permits opening of the damper as the engine load increases to limit the back-pressure.

The spent exhaust gases leave the condenser at 16, preferably through the horn 15 which serves to direct the delivery and to discourage the entry of foreign matter into the condenser. If it becomes necessary the exhaust may be taken away through a discharge line; but if a long line is used care should be exercised to avoid any substantial pressure-drop which would increase the pressure required of the exhaust delivery to the condenser.

Figure II is a schematic of the condenser alone. The principal heat-dissipating structure consists of three finned tubes, 33, 43 and 45, which are cooled by air passing over them as already indicated. The various transfers and other elements of the condenser exposed to contact with combustion-product gases also do a share of the total cooling. Exhaust gases from the engine arriving through the duct 13 first enter a swirl-fitting 47 provided with vanes 48. Leaving these vanes the gases enter the first or pre-cooler tube in a rapidly rotating condition which greatly assists the transfer of heat to the tube. Normally this pre-cooler tube reduces the temperature of the gases passing through by a major amount as compared with the other tubes of the condenser; but the gases leaving this tube are usually still above their dew-point. These gases enter the transfer fitting 44 which removes the swirl by a tangential delivery to the first condensing tube 43. As the gases progress along the tube 43 they are cooled to their dew-point and precipitation begins. Drops of water forming on the wall of the tube gather additional moisture until they run free and are carried through by the stream of gases. This moisture on the tube walls, being in effective contact with the rapidly rotating gases, also picks up particles of solids such as carbon which may be present as well as the greater part of the acid-forming sulphur compounds, which are water-soluble.

Leaving the first condenser tube 43 the gases and the first precipitated water enter the chamber 49 which contains the thermostatic control valve 41. This valve, in cooperation with the seat 42, throttles the flow of gases to such amount as will maintain the temperature of the gases passing through the chamber 49 substantially constant at a level which I will call the "split" temperature of the condenser. The value of this temperature determines the amount of water precipitated in the first condenser section, which is rejected, relative to that precipitated in the following portion of the condenser, which is retained for use as needed. This split temperature is close to the "set" temperature of the thermostat 41, which I will define as that temperature which, while holding the thermostatic valve 41 at the mid-point of its control range, gives the desired split temperature under the optimum exhaust-gas supply pressure to the condenser. In practice I obtain the desired split by varying the set temperature of the thermostat until the amount of water rejected bears a desirable relationship to that retained in the following stage. I usually prefer to reject about one-third of the total water condensed. I have found, specifically, that a set temperature of 135 degrees F. gives good results with most engines using natural gas as a fuel. I obtain this temperature by using acetone as the filling liquid of the thermostat. Gasoline and diesel engines require substantially lower set temperatures because of their lower combustion-product gas moisture content. For these, I prefer to work with a number of thermostatic valves having a substantial range of set temperatures, selecting that best suited to a particular application by actual test. The set temperature will preferably be as high as possible consistent with obtaining an adequate amount of water in the first or reject condensing stage.

After passing the thermostat 41 and the valve seat 42 the gases enter the swirl and separator chamber 24, being deflected into tangential motion by the wall 50. In the chamber 24 the rapidly rotating gases shed small particles of water which may have passed the thermostat. There is also a small amount of condensation in this chamber, which is to be rejected; thus the "split" in condensate and temperature should properly be considered as occurring at this point rather than in the thermostat chamber 49. However, the two temperatures are close together and vary together; so that control at the thermostat position is equivalent for practical purposes to control responsive to the exit temperature of the separator chamber 24.

Water from the chamber 24 is shown in Figure II as being rejected at 39, while that from the thermostat chamber 49 is shown as being drained at 40. As will be later apparent, I prefer in practice to combine these drains as a matter of convenience.

Gases leaving the chamber 24 pass over the barrier 52, the purpose of which is to prevent loss of final condensate from the second condenser tube 33 back into the separator chamber 24. Flow over this barrier is in spiral fashion and does not break the swirl from the separator chamber 24, which remains effective throughout the length of the final condenser tube 33. This tube, which is preferably larger in diameter than those which precede it, is effective likewise in condensing usable water over its entire length. Condensate so produced passes into the final separator 58, and leaves at 18 to be delivered to the cooling system of the engine. Waste gases pass out at 16, to be delivered to the atmosphere through the horn 15.

Accumulation of water in the engine cooling system may continue until the level of the overflow 32 is reached, after which further condensate is drained away.

Figures III to VII, inclusive, show in detail a preferred form of my engine exhaust condenser. The three heat exchanger tubes, 33, 43, and 45 correspond to the like-numbered tubes of the schematic, Figure II. Each is provided with a spirally crimp-wound fin, designated 34 for the final condenser tube 33, 46 for the first condenser tube 43, and 51 for the pre-cooler tube 45. These fins are tightly wound to their respective tubes and anchored at both ends by means of the posts designated generally by the numeral 37. The fins are shown in conventionalized fashion in Fig. III as straight lines, approximating the actual shape of the crests. The fin roots are sharply crimped and give the erect position of each fin great stability.

Each of these heat exchanger tubes terminates in a plain length at each end. These plain tube ends are assembled into end-retaining and flow-directing members hereafter to be designated and sealed by means of rubber O-rings designated 35 for the tube 33 and 36 for each of the tubes 43 and 45. Assembly is made simply by forcing each tube end into a bore provided for it in its retaining member, past the O-ring which is contained in a recessed groove in each bore. Dimensional interference insures a tight seal.

The principal tube end-retaining means are the main end castings 30 and 38. To these are secured the subsidiary retaining means 44 and 47. The whole assembly is secured in its correct longitudinal space relationship by means of two sheet-metal shroud pieces 22 and 25, which are joined to the main end castings 30 and 38 by means of the screws 23. These shroud pieces also serve to direct the flow of cooling air around the heat exchanger tubes, as mechanical protection for the tubes, and as shielding from the direct rays of the sun. For the purpose of securing the assembly alone, any simple external bracket or like means would suffice.

The shroud-piece 22 is bent inwardly at 23 and the piece 25 inwardly at 26 to give direction to the flow of air into the condenser through the opening 80. The front shroud-piece 25 is carried underneath toward the rear of the unit, terminating in the bent-down edge 27 which may be made of any desired length and at any desired angle in order to limit as desired the flow of air from the opening at 70 between the two shroud-pieces 22 and 25. Restriction of this opening may occasionally be of value in cold-weather applications.

Exhaust gases delivered through the tube 13 from the engine exhaust take-off 9 (Figure I) enter the first swirl-fitting 47, seen in section in Figure V. This fitting is secured to the end casting 38 by means of the screws 21, leaving openings generally designated as 76 between the body of the fitting and the casting 38. These openings serve the dual purpose of isolating thermally the fitting 47, which operates at a susbtantial heat, and of allowing a flow of cooling air to enter the condenser around the fitting.

As already explained in connection with the schematic of Figure II, exhaust gases entering at 53 pass to the chamber 58, encounter the vanes 48, are given a strong swirl thereby, and enter the pre-cooler tube 45 in a rapidly rotating condition. This swirl persists to the opposite end of the tube 45, where it enters the transfer fitting 44.

The fitting 44, which secures both of the tubes 43 and 45, is in turn secured to the end casting 30 by means of the screws 29. This transfer fitting is isolated from the main end casting 30 in the same manner as is the fitting 47 from the casting 38. Cooling air enters the condenser around the fitting 44 in like manner.

Transfer of gases from the pre-cooler tube 45 into the first condenser tube 43 continues the swirl in its original sense. This is accomplished by offsetting vertically the transfer passage 88 as shown.

The first condenser tube 43, into which the transfer 44 delivers, terminates at its opposite or delivery end in the end casting 38, delivering its gases to the thermostat chamber 49 therein. Figure VII shows this construction in section.

The thermostatic valve 41 controls the flow of gases past the seat 42 into the separator chamber 24, past the flow-directing wall 50. The thermostat 41 is placed in the chamber 49 from below, being threaded into the casting 38 at 89 and sealed by means of the shoulder 91 compressing the rubber O-ring 69 against the recess 93 in the casting 38. The body of the thermostat, also designated 41, is itself recessed at 71 and provided with lugs 72 to engage with a wrench during assembly. The moving valve portion of the thermostat is the cup 65 which, when pushed upward by the action of the fluid within the bellows 66, restricts the exit of gases from the chamber 49 by approaching the seat 42. This cup fits freely into the bore 92 in the thermostat body 41. Small drain holes 70 prevent over-accumulation of water in the bottom of this bore.

The bellows 66 is sealed at its upper end and secured to the under side of the cup 65 by soldering. At its lower end the bellows is soldered to the stud 67, which passes through the web 73 in the thermostat body 41 and is secured by the nut 68. The bellows assembly is filled with the chosen thermostatic fluid selected for the desired set temperature through the drilled hole 94 in the stud 67. Sealing is accomplished by forcing the plug 95 into this hole and following with solder in a well-known manner.

To permit the bellows and cup assembly to be handled separately from the thermostat body 41 after filling and sealing, I prefer to use the "solid-fill" method, in which the liquid volume inside the bellows is sufficient to fill the bellows in the normal retracted position. A limited fill could be used, but only in case the complete thermostat is assembled before filling the bellows in order to allow the lower edge of the cup 65 to prevent collapsing by encountering the web 73.

Action of the thermostat is as follows:

When the engine is started from cold, the bellows 66 and valve cup 65 are in fully retracted position. As soon as delivery of exhaust gases to the condenser begins the temperature in the chamber 49 rises. As the approach of normal regulated operating temperature is sensed by heat transfer to the thermostat, evaporation of the liquid within the bellows begins and the bellows is pushed upward toward the seat 42, throttling the flow of gases down to an amount which will just maintain the desired temperature. Should the temperature rise too high, further evaporation within the bellows will produce the necessary curtailment of gas flow. Should the temperature fall too low, vapor within the bellows will condense, permitting the valve cup 65 to drop in order to increase the flow of gases, which then brings about an increase in temperature.

Condensate from the first condenser section is rejected through the drain 40, which connects with the pressed-in internal drain tube 56. This tube draws water and a small quantity of gases from the pocket 55 at the bottom of the separator chamber 24, where water carried over is removed before passage of the gases into the final tube 33. The same tube 56 also draws water from the bottom of the thermostat chamber 49, through the drilled hole 57.

The port 54 in the barrier 52 permits excess condensate from the final condensing stage to overflow into the separator chamber 24 and join the reject water passing out the drain 40. Either this port or the alternate overflow 32 in the final separator should be plugged. Overflow at 54 will generally be preferred unless it is desired to save the surplus water. Besides the advantage of simplicity, the position of the port 54 remote from the water connection to the engine at 18 minimizes the possibility of rejecting additives which could enter the condenser by back-flow from the engine cooling system.

The vapor-return connection 61 in the first separator end casting 38 should be plugged when not used. Engines which suffer from excessive loss of water vapor may be helped by connecting as already shown in Figure I. Any mild return of vapor will be condensed in the vapor-return line under ordinary conditions and join the reject water from the first separator 24. A strong flow of vapor enters the condenser as such and passes on into the final condensing stage to be recovered. If it is desired to recover all moisture returned by the tube 62 this may be done by carrying the tube through the connection 61 and over the barrier into the final condensing tube 33.

I claim:

1. That method of obtaining water of desirable purity from combustion product gases of an internal combustion engine which comprises passing such gases through cooling means sufficient to precipitate water therefrom in amount substantially below that totally available in said gases, then passing such gases through further cooling means sufficient to precipitate the greater amount of the remaining available water, and collecting for use the condensate of said further cooling means separately from that of the first.

2. That method of maintaining a supply of adequately pure water in the cooling system of an internal combustion engine which comprises passing combustion product gases of said engine through cooling means sufficient to precipitate water therefrom in amount substantially below that totally available in said gases, then passing such gases through further cooling means sufficient to precipitate the greater amount of the remaining available water, collecting the condensate of said further cooling means separately from that of the first, and delivering the condensate of said further cooling means to the cooling system of the engine.

3. In combination with an internal combustion engine having a water cooling system and a radiator together with means for causing a flow of cooling air through said radiator, an exhaust condenser placed in the flow of air through said radiator, means for delivering engine combustion product gases to said condenser, means for conducting water recovered from such gases by said condenser into said water cooling system, and means for varying the flow of air simultaneously through said radiator and through said condenser.

4. In an internal combustion engine installation, an engine, a condenser divided into at least two condensing sections adapted to recover their condensates separately, means for delivering a portion of the exhaust of said engine to said condenser, and means for imposing upon the exhaust of said engine a minimum pressure adequate to insure a substantial yield of condensate in each of said condensing sections under lightly loaded conditions of the engine.

5. In an internal combustion engine installation, an engine, a condenser divided into at least two condensing sections adapted to recover their condensates separately, means for delivering a portion of the exhaust of said engine to said condenser, and yieldably loaded means for imposing upon the exhaust of said engine a minimum pressure adequate to insure a substantial yield of condensate in each of said condensing sections under lightly loaded conditions of the engine.

6. In a condenser for the recovery of water from combustion product gases, a first condensing section, a second condensing section adapted to recover its condensate separately from that of the first, means for passing combustion product gases through said condensing sections in sequence, means for cooling said condenser, and means responsive substantially to the temperature between said condensing sections for holding such temperature below the dew-point of said combustion product gases and adapted to control the flow through said condenser of said combustion product gases.

7. In a condenser for the recovery of water from combustion product gases, a first condensing section, a second condensing section adapted to recover its condensate separately from that of the first, means for passing combustion product gases through said condensing sections in sequence, means for cooling said condenser, and thermostatic valve means for throttling the flow of combustion product gases through said condenser, said thermostatic valve means being responsive to the temperature of combustion product gases passing from said first to said second condensing section and having a set control range below the dew-point of such gases.

8. In a condenser for the recovery of water from combustion product gases, first and second condensing sections together with control means for maintaining the temperature of combustion product gases passing from said first to said second condensing section below the dew-point of such gases, and a pre-cooling section ahead of said first condensing section, adapted to cool said gases to a temperature above their dew-point.

9. In a condenser for the recovery of water from combustion product gases, in series, a first condensing section, a centrifugal swirl separator adapted to receive gases from said first condensing section and to remove water therefrom, and a second condensing section adapted to receive gases from said separator while still in a swirling condition.

10. In a condenser for the recovery of water from combustion product gases, a pre-cooler, a first condensing section, a second condensing section, means for maintaining the temperature of combustion product gases passing from said first to said second condensing section below the dew-point of such gases, and means for recovering the condensate of said second condensing section separately from that of said first condensing section, said second condensing section being placed at a level generally higher than said first condensing section.

11. In a condenser for the recovery of water from combustion product gases, a pre-cooler tube, a first condenser tube, means for separating out water condensate from combustion product gases leaving said first condenser tube, a second condenser tube placed at a higher level than that of said first condenser tube, means for separating out water condensate from combustion product gases leaving said second condenser tube, and means for recovering such condensate of said second condenser tube for use.

12. In a condenser for the recovery of water from combustion product gases, a plurality of substantially straight and parallel heat exchanger tubes, opposing retainer means adapted to receive and to seal such tubes at their opposite ends and to direct flow of combustion product gases to and from each of said tubes, and means external to said tubes and separate therefrom for holding said opposing retainer means in spaced relationship.

13. In a condenser for the recovery of water from combustion product gases, a pre-cooler tube, a first condenser tube, a second condenser tube, opposing tube retaining means adapted to receive and to seal the opposite ends of at least said second condenser tube, and subsidiary tube retaining means secured to but separable from said opposing tube retaining means and adapted to receive and to seal said pre-cooler and said first condenser tubes.

14. In a condenser for the recovery of water from combustion product gases, a plurality of substantially straight and parallel heat exchanger tubes, opposing retainer means adapted to receive and seal said tubes at their ends, and means for shrouding the flow of air around said tubes and adapted to secure and locate said opposing retainer means in spaced relationship.

ROBERT E. NELSON.

REFERENCES CITED

The following references are of record in the file of this patent:

UNITED STATES PATENTS

| Number | Name | Date |
| --- | --- | --- |
| 1,186,319 | Langdon | June 6, 1916 |
| 1,426,047 | Cook | Aug. 15, 1922 |
| 1,503,374 | Parker | July 29, 1924 |
| 1,653,603 | Schroder | Dec. 20, 1927 |
| 1,728,973 | Longerman | Sept. 24, 1929 |
| 2,310,767 | Durr | Feb. 9, 1943 |